United States Patent
Meisl et al.

(10) Patent No.: US 10,184,351 B2
(45) Date of Patent: Jan. 22, 2019

(54) GAS TURBINE WITH A BYPASS LINE FOR IMPROVED FUEL LINE FLUSHING, AND METHOD FOR FLUSHING A GAS TURBINE

(71) Applicant: Siemens Aktiengesellschaft, Munich (DE)

(72) Inventors: Jürgen Meisl, Mülheim an der Ruhr (DE); James Smith, Raesfeld (DE)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 15/100,738

(22) PCT Filed: Dec. 3, 2014

(86) PCT No.: PCT/EP2014/076370
§ 371 (c)(1),
(2) Date: Jun. 1, 2016

(87) PCT Pub. No.: WO2015/086390
PCT Pub. Date: Jun. 18, 2015

(65) Prior Publication Data
US 2016/0305276 A1    Oct. 20, 2016

(30) Foreign Application Priority Data

Dec. 9, 2013 (DE) .......................... 10 2013 225 254

(51) Int. Cl.
*F01D 25/00* (2006.01)
*F02C 7/22* (2006.01)
(Continued)

(52) U.S. Cl.
CPC .......... *F01D 25/002* (2013.01); *F01D 25/32* (2013.01); *F02C 7/22* (2013.01); *F02C 7/222* (2013.01);
(Continued)

(58) Field of Classification Search
CPC .......... F01D 25/002; F01D 25/32; F23R 3/28; F23R 2900/00004; F02C 7/222;
(Continued)

(56) References Cited

U.S. PATENT DOCUMENTS 6,145,294 A * 11/2000 Traver ...................... F23K 5/18
60/39.094
6,256,975 B1 * 7/2001 Dobbeling ............. B64D 37/26
60/39.094
(Continued)

FOREIGN PATENT DOCUMENTS

EP    0939220 A1    9/1999
EP    2216529 A1    8/2010
(Continued)

OTHER PUBLICATIONS

JP Notice of Allowance dated Sep. 4, 2017, for JP patent application No. 2016537467.

*Primary Examiner* — Jason Newton
(74) *Attorney, Agent, or Firm* — Beusse Wolter Sanks & Maire

(57) ABSTRACT

A gas turbine with a burner, which gas turbine has at least one fuel feed line and at least one fuel outflow line, wherein a flushing water line is connected fluidically to the fuel feed line, and wherein a leakage oil tank is connected fluidically via a drainage line to the fuel outflow line and the connection of the fuel outflow line and the drainage line is provided at a point downstream of at least one closure valve in the fuel outflow line, wherein a bypass line is connected fluidically to the fuel outflow line upstream of the closure valve, which bypass line connects the fuel outflow line fluidically to the leakage oil tank.

10 Claims, 1 Drawing Sheet

(51) Int. Cl.
*F23K 5/04* (2006.01)
*F01D 25/32* (2006.01)
*F02C 7/232* (2006.01)
*F23R 3/28* (2006.01)

(52) U.S. Cl.
CPC ............ *F02C 7/232* (2013.01); *F23K 5/04* (2013.01); *F23R 3/28* (2013.01); *F05D 2260/602* (2013.01); *F23K 2301/203* (2013.01); *F23R 2900/00004* (2013.01)

(58) Field of Classification Search
CPC .... F02C 7/232; F02C 7/22; F02C 9/36; F02C 9/38; F02C 9/263; F23K 5/04; F23K 2301/203; F23D 2209/30; F05D 2260/602
USPC ............................................. 60/779, 39.094
See application file for complete search history.

(56) References Cited

U.S. PATENT DOCUMENTS

| | | | | |
|---|---|---|---|---|
| 8,991,190 | B2* | 3/2015 | Zhang | F23K 5/14 60/39.094 |
| 9,188,061 | B2* | 11/2015 | Zhang | F02C 3/305 |
| 2008/0087300 | A1* | 4/2008 | Kohler | F01D 25/002 134/18 |
| 2011/0146807 | A1* | 6/2011 | Bassmann | F02C 7/222 137/15.05 |
| 2011/0277480 | A1 | 11/2011 | Aboujaib et al. | |
| 2011/0289927 | A1* | 12/2011 | Wagner | F02C 7/232 60/734 |
| 2012/0137699 | A1* | 6/2012 | Montagne | F02C 7/22 60/779 |
| 2012/0167547 | A1* | 7/2012 | Zhang | F01D 25/002 60/39.183 |
| 2012/0174591 | A1 | 7/2012 | Hase et al. | |
| 2013/0098041 | A1* | 4/2013 | Zhang | F23K 5/005 60/734 |
| 2015/0337735 | A1* | 11/2015 | Selfridge | F02C 7/232 60/779 |
| 2016/0305276 | A1* | 10/2016 | Meisl | F01D 25/002 |

FOREIGN PATENT DOCUMENTS

| | | |
|---|---|---|
| JP | 2000064855 A | 2/2000 |
| JP | 2011522990 A | 8/2011 |
| JP | 2012507654 A | 3/2012 |
| JP | 2012516970 A | 7/2012 |
| JP | 2013060843 A | 4/2013 |
| WO | 2010089204 A1 | 8/2010 |
| WO | 2011036205 A1 | 3/2011 |

* cited by examiner

GAS TURBINE WITH A BYPASS LINE FOR IMPROVED FUEL LINE FLUSHING, AND METHOD FOR FLUSHING A GAS TURBINE

CROSS REFERENCE TO RELATED APPLICATIONS

This application is the US National Stage of International Application No. PCT/EP2014/076370 filed Dec. 3, 2014, and claims the benefit thereof. The International Application claims the benefit of German Application No. DE 102013225254.4 filed Dec. 9, 2013. All of the applications are incorporated by reference herein in their entirety.

FIELD OF INVENTION

The present invention relates to a gas turbine with improved flushing behavior during displacement flushing of fuel from a fuel line, and to a method for operating such a gas turbine.

BACKGROUND OF INVENTION

The operation of a gas turbine with liquid fuels, for example oil, requires, at regular intervals, water flushing of the fuel lines in order that oil residues remaining in the fuel lines cannot combust or coke and thus lead to damage and disruption to operation. According to the internal prior art known to the applicant, gas turbines are typically supplied with flush water under pressure via a flush water line, such that the pressurized flush water can remove, for cleaning, the fuel present in the fuel lines. This amounts to displacement flushing, wherein the displaced fuel can be returned, with parts of the flush water, into a fuel supply container that supplies the gas turbine. If this return takes place over an unsuitably long time, in particular during shutdown of the gas turbine, the compressor end pressure of the gas turbine can become so low that the displacement flushing must be halted in order to prevent undesired penetration of fuel and/or flush water from the fuel lines into the burner and thus into the combustion chamber of the gas turbine.

To that end, the flushing procedure known from the prior art provides limiting the flushing duration, in particular during shutdown of the gas turbine, in order to avoid such drawbacks. In this context, flushing durations of less than 30 seconds are generally selected in order to be able to ensure reliable operation.

However, a time limitation of this type has the drawback that the flushing of the fuel lines by means of the flush water is not sufficiently complete, and thus in turn undesirably large quantities of liquid fuel can remain in the fuel lines. This gives rise to the technical requirement of proposing a gas turbine which permits better flushing of the fuel lines. Also to be proposed is a method which avoids the drawbacks known from the prior art and permits improved and more efficient flushing of the fuel lines of the gas turbine. This is to take place in particular during shutdown of the gas turbine.

SUMMARY OF INVENTION

Objects upon which the invention is based are achieved with a gas turbine as claimed and with a method for flushing such a gas turbine—as described above and below—as claimed.

In particular, the objects upon which the invention is based are achieved with a gas turbine with a burner which has at least one fuel supply line and at least one fuel removal line, wherein the fuel supply line is fluidically connected to a flush water line, and wherein the fuel removal line is fluidically connected, via a drainage line, to a leakage oil tank and the fuel removal line and the drainage line are connected at a point downstream of at least one closure valve in the fuel removal line, wherein upstream of the at least one closure valve a bypass line is fluidically connected to the fuel removal line, which bypass line fluidically connects the fuel removal line to the leakage oil tank.

The objects upon which the invention is based are also achieved with a method for flushing a gas turbine, in particular a gas turbine as illustrated above and below, which has the following steps: —introducing flush water from a flush water line into a fuel supply line under pressure such that the flush water displaces at least part of the fuel in the fuel supply line in the direction of the burner; —removing fuel from the fuel removal line by means of the flush water; —interrupting part of the removal of fuel in the fuel removal line by closing a closure valve in the fuel removal line at a time T1; —maintaining the removal of fuel from the fuel removal line via a bypass line into a leakage oil tank after the time T1, wherein the bypass line is fluidically connected to the fuel removal line upstream of the closure valve.

At this point, it should first be mentioned that, within the context of the present invention, fuel lines are to be understood as referring to fuel supply lines and fuel removal lines and auxiliary lines provided therewith.

In this context, the bypass line according to the invention is also provided or designed for the removal of liquid fuel into the leakage oil tank. In this context, removal corresponds to delivery using the principles of displacement.

It is also to be mentioned that the leakage oil tank according to the invention is designed such that it is open or can be opened, typically to the environment, for pressure equalization. In that regard, when removing fuel and/or flush water into the leakage oil tank, it is possible to equalize the pressure such that there is no build-up of pressure which could have a negative effect, in terms of pressure, on the flushing of the fuel lines.

Also, the fuel removal line and the fuel supply line are normally fluidically connected to a fuel supply container which can typically also permit pressure equalization with the environment. In this context, the pressure level in the fuel removal line is essentially determined by the pressure level in the fuel supply container, and in particular by the fill level in the latter.

At this point, it should also be mentioned that a closure valve can permit the complete interruption of a flow in a fuel line. It thus differs from conventional control or actuation valves, by means of which it is not possible to interrupt the flow in the relevant line, although it can also be identical with these as long as a closed position is possible. The closure valve is in particular designed as a ball valve or a quick-closing valve.

It is also to be mentioned that the flow direction in the fuel removal line should match the flow direction during regular use, in which therefore fuel from the burner is for example returned via the fuel removal line to the fuel supply container. Thus, the flow direction of the fuel in the fuel removal line is oriented counter to the flow direction in the fuel supply line, since the latter conveys fuel to the burner.

It is provided according to the invention to expand the gas turbine with a bypass line by means of which the removal of fuel from the fuel removal line into the leakage oil tank is still possible even after closure of the at least one closure valve in the fuel removal line. Thus, the bypass line permits valve-based separation of the fuel supply container from parts of the fuel removal line, while allowing the flushing procedure using flush water from the flush water line to still be continued in time. On account of the continuation of the flushing procedure, sufficient cleaning of the fuel lines is possible even after closure of the at least one closure valve.

By virtue of the improved flushing, it can be ensured that, once the gas turbine has been shut down, the fuel lines have markedly less fuel residue. This reduces, on one hand, the risks with respect to uncontrolled combustion of this fuel residue and the damage resulting therefrom. Also improved is the reduction of coking phenomena of this fuel residue in the fuel lines, as a result of which a blockage of nozzles supplied with the fuel, and resulting operational restrictions or reduction in performance, can be prevented.

At this point, it should once again be mentioned that the pressure in the fuel removal line, when the closure valves are open, is essentially determined by the pressure of the fuel supply container. By contrast, the pressure in the flush water line is generally substantially higher (approximately 20-30 bar) and can thus displace and clean the fuel in the fuel supply line by virtue of a pressure drop toward the burner. However, the pressure difference required for displacing the fuel in the fuel removal line results from the pressure difference between the compressor end pressure, which acts essentially at the fuel nozzles, and the pressure level of the fuel supply container, which essentially imparts its pressure to the fuel removal line. Since gas turbines which are provided with such fuel lines generally have return-flow-regulated fuel nozzles, a return flow out of the fuel removal line can be avoided as long as the compressor end pressure is higher than the pressure level in the fuel removal line. Only when this pressure difference approaches zero or is negative is there a risk of a return flow of fuel and/or flush water from the fuel removal line back into the fuel nozzles. However, the purpose of the present invention is to avoid such a return flow.

According to a first embodiment of the invention, it is provided that the bypass line has at least one shutoff valve, in particular two shutoff valves. In this context, a shutoff valve once again permits, in a manner comparable to a closure valve, the complete interruption of the fluid flow in a line. The shutoff valve can be of the same design as the closure valve, for example as a quick-closing valve, but is designed according to another embodiment as a ball valve. In this context, the provision of two shutoff valves can increase operational reliability in that, for example in the event of one shutoff valve failing, the second shutoff valve can perform the shutoff task. Providing the bypass line with at least one shutoff valve makes it possible to interrupt the bypass line during the flushing procedure, after which the removal of fuel is possible only via the fuel removal line to the fuel supply container, provided that the closure valves are open. This assumes that, during this flushing procedure, the drainage line is also interrupted, if this is even designed for removal of fuel into the leakage oil tank. However, this is generally not the case since the drainage line is designed only to convey small quantities of fuel.

According to another possible embodiment of the invention, it is provided that the drainage line has at least one shutoff valve. The shutoff valve of the drainage line permits, as already explained above, the complete interruption of a fluid flow in the drainage line. Thus, the drainage line can be interrupted during the flushing procedure. The drainage line can however also be opened in a targeted manner, for example in order to empty part sections of the fuel removal line which cannot be further flushed with flush water. It is also provided that the drainage line is designed as a pressure-relief line, the cross section of which is in particular smaller than the cross section of the bypass line. In that regard, the drainage line cannot be used in a comparable manner for the removal of relatively large quantities of fuel and flush water, as is for example possible with the bypass line.

Such an emptying or pressure relief is advantageously to be provided in particular if, according to another embodiment of the gas turbine according to the invention, the fuel removal line has at least two closure valves, and the drainage line is fluidically connected to the fuel removal line between the two closure valves. If the two closure valves are namely for example completely closed during the flushing procedure, the fuel in the fuel removal line between the two closure valves can be at least partially removed into the leakage oil tank via the drainage line, or a buildup of pressure can efficiently be prevented. Thus, the drainage line can primarily serve for improved reliability during operation.

According to a first embodiment of the method according to the invention, it is provided that the introduction of flush water from the flush water line into the fuel supply line during shutdown of the gas turbine takes place in particular as long as a compressor end pressure of at least 1.5 bar still prevails. Particularly, in this context the compressor end pressure is above the pressure level of the fuel supply container. Due to the suitable pressure difference between the compressor end pressure and the pressure in the fuel removal line, neither fuel nor flush water can pass through the burners into the combustion chamber. Moreover, the relatively high compressor end pressure ensures that the fuel to be removed and/or flush water can pass via the fuel removal line to the leakage oil tank or back to the fuel supply container. Only when the compressor end pressure falls below the pressure level of the fuel supply container can fluid escape into the burner and thus into the combustion chamber. However, such an event is to be avoided.

According to another embodiment of the method according to the invention, it is provided that after a second time T2, greater than the first time T1, at least one shutoff valve in the bypass line is closed in order to thus interrupt the removal of fuel from the fuel removal line via the bypass line into the leakage oil tank. Thus, the flushing procedure is ended after the time T2. Continued flushing via the fuel removal line is prevented by the at least one closed closure valve. In that regard, the second time T2 determines the length of the flushing duration and thus the efficiency of the flushing in the fuel lines. On the basis of internal tests, the applicant has discovered that a time duration of 1 to 2 minutes is particularly suitable since this allows, on one hand, a flushing procedure which is economic in terms of flush water to be carried out, but on the other hand a satisfactory flushing effect can also be achieved. In these tests, the applicant has also learnt that the first time T1, at which the closure valves in the fuel removal line are closed, should advantageously be 30 to 45 seconds.

In the following, the invention is explained in greater detail with reference to individual figures. In this context, the technical features that are provided with identical reference signs indicate identical technical effects.

It is also to be noted that the embodiments of the invention illustrated below are to be understood as being merely schematic, and no limitation with respect to the practicability of the invention can be derived therefrom.

In addition, the individual technical features illustrated in the following figures are claimed in any desired combination

DETAILED DESCRIPTION OF INVENTION

Figure 1:
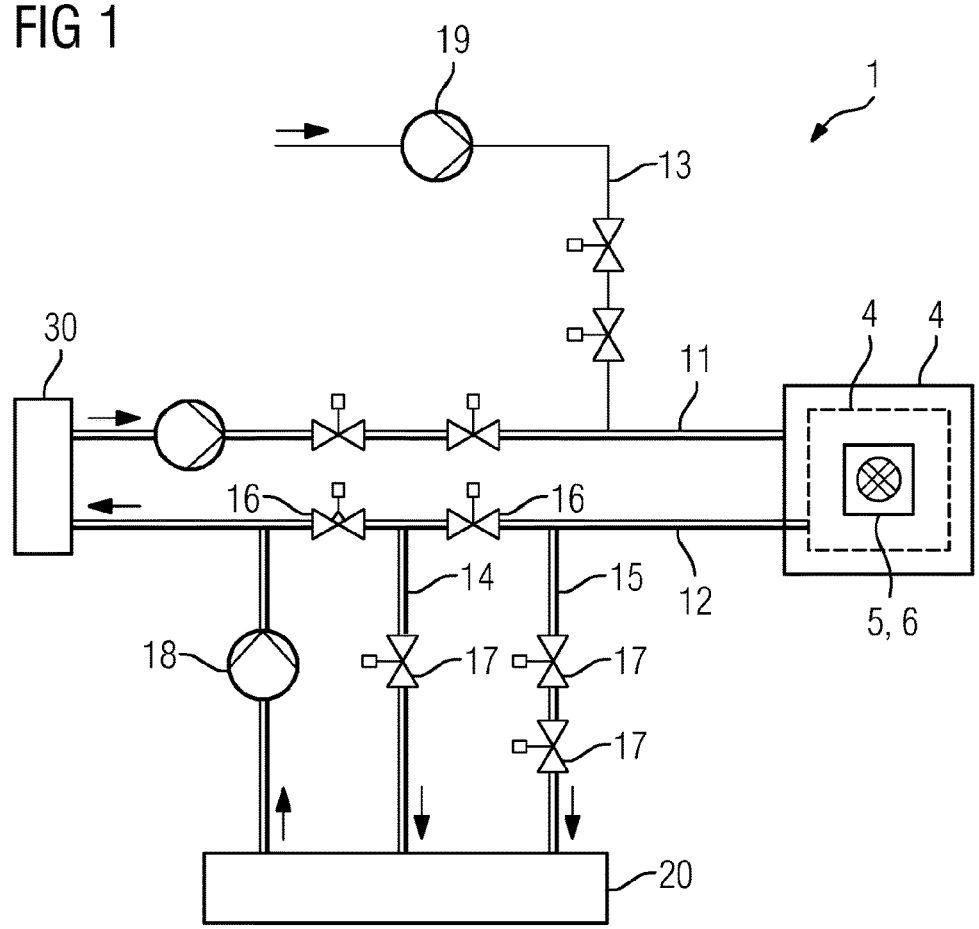
FIG. 1 shows a schematic partial view of connections of one embodiment of the gas turbine 1 according to the invention.

FIG. 1 shows a schematic partial view of connections of one embodiment of the gas turbine 1 according to the invention which, in addition to a fuel supply line 11 supplying fuel to a fuel distribution system 4, also provides a fuel removal line 12 via which fuel can be removed again from the fuel distribution system. The fuel distribution system 4 can for example consist of fuel distribution rings which surround the gas turbine 1 and supply fuel to a burner 5 (or a plurality of burners 5) via branch lines which are not shown in more detail. The fuel distribution system 4 in particular has return-flow-regulated fuel nozzles. In the present case, the burner 5 is indicated schematically together with the combustion chamber 6. The specific embodiment of the fuel distribution system 4 is also indicated only schematically here.

The fuel supplied to the gas turbine 1 is taken from a fuel supply container 30 which is fluidically connected both to the fuel supply line and to the fuel removal line 12.

Flushing of both the fuel supply line and the fuel removal line 12 is carried out using flush water from a flush water line 13 that is fluidically connected to the fuel supply line 11. Here, the flush water line 13 has a pump 19 which can convey flush water under pressure from a container (not shown) to the fuel supply line. In the fuel supply line 11, flush water is prevented from flowing back to the fuel supply container 30 by valves (not provided with reference signs) which in that context are in a closed position. In that regard, flushing is carried out in that flush water from the flush line 13 is passed into the fuel supply line 11 by the pump 19 when the pressure is increased, which displaces the fuel in the fuel supply line 11, in the burner 5 and in the fuel removal line.

The flushing procedure is typically begun at a time during shutdown of the gas turbine 1. In this context, there is at the end of the compressor the compressor end pressure which is higher than the pressure imparted to the fuel removal line 12 by the fuel supply container 30. This prevents the fuel and/or the flush water from flowing into the burner 5 and thus into the combustion chamber 6. In addition, the fuel is displaced in the direction of the fuel removal line 12, via which it is guided either to the fuel supply container 30 in the event that the closure valves 16 are open, or via the bypass line 15 to the leakage oil tank in the event that the shutoff valves 17 are open.

In the present case, the fuel removal line 12 has, in all, two closure valves 16 which can perform essentially the same function, but doubling the number of valves increases the operational reliability. The fuel removal line is fluidically connected, upstream of that closure valve 16 most closely associated with the burner, to a bypass line 15 such that it is possible to remove fuel via this bypass line 15 even when the closure valves 16 are closed. The bypass line 15 fluidically connects the fuel removal line 12 to a leakage oil tank 20. Moreover, the bypass line 15 has two shutoff valves 17 which, in a manner comparable to the closure valves 16, can interrupt the flow in the bypass line 15.

Furthermore, the leakage oil tank 20 is fluidically connected to a drainage line 14, wherein the drainage line 14 discharges into the fuel removal line 12 between the two closure valves 16. Therefore, if the closure valve 16 most closely associated with the burner 5 is closed, it is normally impossible for any more fuel and/or flush water to be removed, via the drainage line 14, from the fuel removal line 16 to the leakage oil tank 20. In addition, the drainage line 14 is normally not designed, in terms of the maximum flow quantity that it can remove, to be used during the flushing procedure for the removal of fuel and flush water to the leakage oil tank 20. Rather, the drainage line 14 often has the function of ensuring pressure relief in the line section of the fuel removal line 12 between the two closure valves 16, in that for example some of the fuel is emptied into the leakage oil tank when both closure valves 16 are properly closed.

Furthermore, the fuel removal line 12 is fluidically connected, in a section downstream of that closure valve 16 arranged furthest from the burner 5, to an emptying line (not provided with a reference sign). The emptying line has a pump 18 by means of which the flush water and/or the fuel in the leakage oil tank can be pumped into the fuel supply container 30 when the closure valves 16 are closed.

If, now, a flushing procedure is initiated at time T0, flush water is first conveyed into the fuel supply line 11 via the flush water line 13. Due to the displacement of the fuel in the fuel supply line, in the burner 5 and in the fuel removal line 12, the fuel is removed, when the closure valves 16 are open and when the shutoff valves 17 are open, in part to the fuel supply container 30 via the fuel removal line 12 and in part to the leakage oil tank 20 via the bypass line 15. Naturally, this assumes suitable pressure conditions in the fuel removal line 12, as described above. Then, at a first time T1, both closure valves 16 in the fuel removal line 12 are closed, such that the pressure of the fuel supply container 30 no longer acts in the fuel removal line 12. This therefore produces a pressure decoupling. In that regard, after the first time T1, only the two shutoff valves 17 in the bypass line 15 remain open, such that the fuel removed in the fuel removal line 12 is discharged via the bypass line 15 to the leakage oil tank 12. In this context, after time T1 the leakage oil tank now essentially determines the pressure conditions in the fuel removal line 12. After a second time T2, in the case of sufficient flushing, the two shutoff valves 17 in the bypass line 15 are closed, thus ending the flushing procedure. In order to still empty the section of the fuel removal line 12 between the two closed closure valves 16, or in order to prevent the pressure from rising above a limit value, the hitherto closed shutoff valve 17 in the drainage line 14 can be opened in order to thus transfer at least part of the fuel therein to the leakage oil tank 20.

Figure 2:
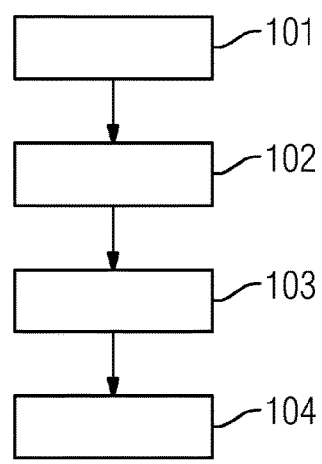
FIG. 2 shows a representation, in the form of a flow chart, of one embodiment of the method according to the invention for flushing such a gas turbine illustrated above and also below.

FIG. 2 shows an embodiment of the method according to the invention for flushing a gas turbine 1, having the following steps: —introducing flush water from a flush water line (13) into a fuel supply line (11) under pressure such that the flush water (13) displaces at least part of the fuel in the fuel supply line (11) in the direction of the burner (5) (first method step 101); —removing fuel from the fuel removal line (12) by means of the flush water (second method step 102); —interrupting part of the removal of fuel in the fuel removal line (12) by closing a closure valve (16) in the fuel removal line (12) at a time T1 (third method step 103); —maintaining the removal of fuel from the fuel removal line (12) via a bypass line (15) into a leakage oil tank (20) after the time T1, wherein the bypass line (15) is fluidically connected to the fuel removal line (12) upstream of the closure valve (16) (fourth method step 104).

Further embodiments are to be found in the subclaims.

The invention claimed is:

1. A gas turbine comprising:
  a burner which has at least one fuel supply line and at least one fuel removal line, wherein the at least one fuel supply line is fluidically connected to a flush water line, and wherein the at least one fuel removal line is fluidically connected, via a drainage line, to a leakage oil tank and the at least one fuel removal line and the drainage line are connected at a point downstream of at least one closure valve in the at least one fuel removal line,
  a bypass line upstream of the at least one closure valve, wherein the bypass line is fluidically connected to the at least one fuel removal line, which bypass line fluidically connects the at least one fuel removal line to the leakage oil tank.

2. The gas turbine as claimed in claim 1, wherein the bypass line has at least one shutoff valve.

3. The gas turbine as claimed in claim 1, wherein the drainage line has at least one shutoff valve.

4. The gas turbine as claimed in claim 1, wherein the at least one fuel removal line has at least two closure valves and the drainage line is fluidically connected to the at least one fuel removal line between the at least two closure valves.

5. A method for flushing fuel from a gas turbine, the method comprising:
  introducing flush water from a flush water line into at least one fuel supply line under pressure such that the flush water displaces at least part of the fuel in the at least one fuel supply line in a direction of a burner;
  removing fuel from a fuel removal line by means of the flush water;
  interrupting part of the removal of fuel from the fuel removal line by closing at least one closure valve in the fuel removal line at a fit time T1;
  maintaining the removal of fuel from the fuel removal line via a bypass line into a leakage oil tank after the first time T1, wherein the bypass line is fluidically connected to the fuel removal line upstream of the closure valve.

6. The method as claimed in claim 5, wherein the introduction of flush water from the flush water line into the fuel supply line during shutdown of the gas turbine takes place as long as a compressor end pressure of at least 1.5 bar still prevails.

7. The method as claimed in claim 5, wherein after a second time T2, greater than the first time T1, at least one shutoff valve in the bypass line is closed in order to thus interrupt the removal of fuel from the fuel removal line via the bypass line into the leakage oil tank.

8. The gas turbine as claimed in claim 1, wherein the bypass line has two shutoff valves.

9. The method as claimed in claim 5, wherein the introduction of flush water from the flush water line into the fuel supply line during shutdown of the gas turbine takes place as long as a compressor end pressure is above a pressure level of a fuel supply container.

10. The method as claimed in claim 5, wherein the gas turbine comprises:
  wherein the fuel removal line is fluidically connected, via a drainage line, to the leakage oil tank and the fuel removal line and the drainage line are connected at a point downstream of j at least one closure valve in the fuel removal line, and the bypass line is upstream of the at least one closure valve, wherein the bypass line is fluidically connected to the fuel removal line, which bypass line fluidically connects the fuel removal line to the leakage oil tank.

* * * * *

UNITED STATES PATENT AND TRADEMARK OFFICE
CERTIFICATE OF CORRECTION

PATENT NO. : 10,184,351 B2
APPLICATION NO. : 15/100738
DATED : January 22, 2019
INVENTOR(S) : Jürgen Meisl and James Smith It is certified that error appears in the above-identified patent and that said Letters Patent is hereby corrected as shown below:

In the Claims

Claim 5, Line 11, remove [ fit ], and insert --first--;

Claim 10, Line 6, remove [ j ], and insert --the--.

Signed and Sealed this
Twelfth Day of March, 2019

Andrei Iancu
*Director of the United States Patent and Trademark Office*